US012672092B2

(12) United States Patent
Chang et al.

(10) Patent No.: US 12,672,092 B2
(45) Date of Patent: Jun. 30, 2026

(54) DEVICE TYPE AND LOCATION RESOLUTION IN A WIRELESS FIDELITY (Wi-Fi) NETWORK

(71) Applicant: PLUME DESIGN, INC., Palo Alto, CA (US)

(72) Inventors: Richard Chang, Los Altos, CA (US); Trevor Condon, Kelowna (CA); Sean Li, Campbell, CA (US); Cuong Vu, Newark, CA (US); Jeff Chao, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 398 days.

(21) Appl. No.: 18/360,869

(22) Filed: Jul. 28, 2023

(65) Prior Publication Data

US 2025/0039823 A1 Jan. 30, 2025

(51) Int. Cl.
H04W 64/00 (2009.01)
G01S 13/76 (2006.01)

(52) U.S. Cl.
CPC ........... H04W 64/00 (2013.01); G01S 13/765 (2013.01)

(58) Field of Classification Search
CPC .............................. H04W 64/00; G01S 13/765
USPC ...................................................... 455/456.1
See application file for complete search history.

(56) References Cited

U.S. PATENT DOCUMENTS

| | | | | |
|---|---|---|---|---|
| 11,375,398 B2 * | 6/2022 | Chandra | ............... | H04W 28/04 |
| 11,825,377 B2 * | 11/2023 | Alemi | .................... | G16H 40/67 |

| | | | | |
|---|---|---|---|---|
| 2012/0063340 A1 * | 3/2012 | Waters | .................. | G01S 5/0242 370/252 |
| 2015/0350850 A1 * | 12/2015 | Edge | ..................... | H04W 88/02 455/456.1 |
| 2018/0020329 A1 * | 1/2018 | Smith | ..................... | H04W 4/08 |
| 2018/0288664 A1 * | 10/2018 | Ouzieli | ................. | H04W 64/00 |
| 2022/0026585 A1 * | 1/2022 | Hassan | ................... | G01S 19/46 |
| 2022/0104177 A1 * | 3/2022 | Shani | ................. | H04W 64/006 |

FOREIGN PATENT DOCUMENTS

| | | | | | |
|---|---|---|---|---|---|
| KR | 20250005134 A | * | 1/2025 | ........... | G01S 13/765 |
| WO | WO-2016115242 A1 | * | 7/2016 | ........... | G01S 19/396 |
| WO | WO-2022081315 A2 | * | 4/2022 | .............. | H04W 4/80 |

OTHER PUBLICATIONS

International Search Report and Written Opinion to corresponding Int'l Appln. No. PCT/US2024/038166 mailed Sep. 10, 2024 (12 pages).

* cited by examiner

*Primary Examiner* — Mahendra R Patel

(74) *Attorney, Agent, or Firm* — Nicholas Martin; Greenberg Traurig, LLP

(57) ABSTRACT

In some implementations, the techniques described herein relate to a method including: transmitting, by an access point, a message to a wireless device and receiving a response to the message, the response including a list of access points nearby the wireless device; determining, by the access point, a location of the wireless device based on the list of access points utilizing a trilateration algorithm; determining, by the access point, a type of the wireless device; identifying, by the access point, one or more nearby wireless devices within a threshold proximity to the wireless device; and categorizing, by the access point, one of the wireless device or a location of the wireless device based on the one or more nearby wireless devices and the type of the wireless device.

20 Claims, 4 Drawing Sheets

DEVICE TYPE AND LOCATION RESOLUTION IN A WIRELESS FIDELITY (Wi-Fi) NETWORK

BACKGROUND

Frequently, wireless fidelity (Wi-Fi) networks include multiple access point (AP) devices to extend the coverage area of a single service set identifier (SSID). Mobile devices can then move within an environment and communicate with these APs. Stationary devices equipped with Wi-Fi interfaces can additionally communicate with an AP.

DETAILED DESCRIPTION

Figure 1:
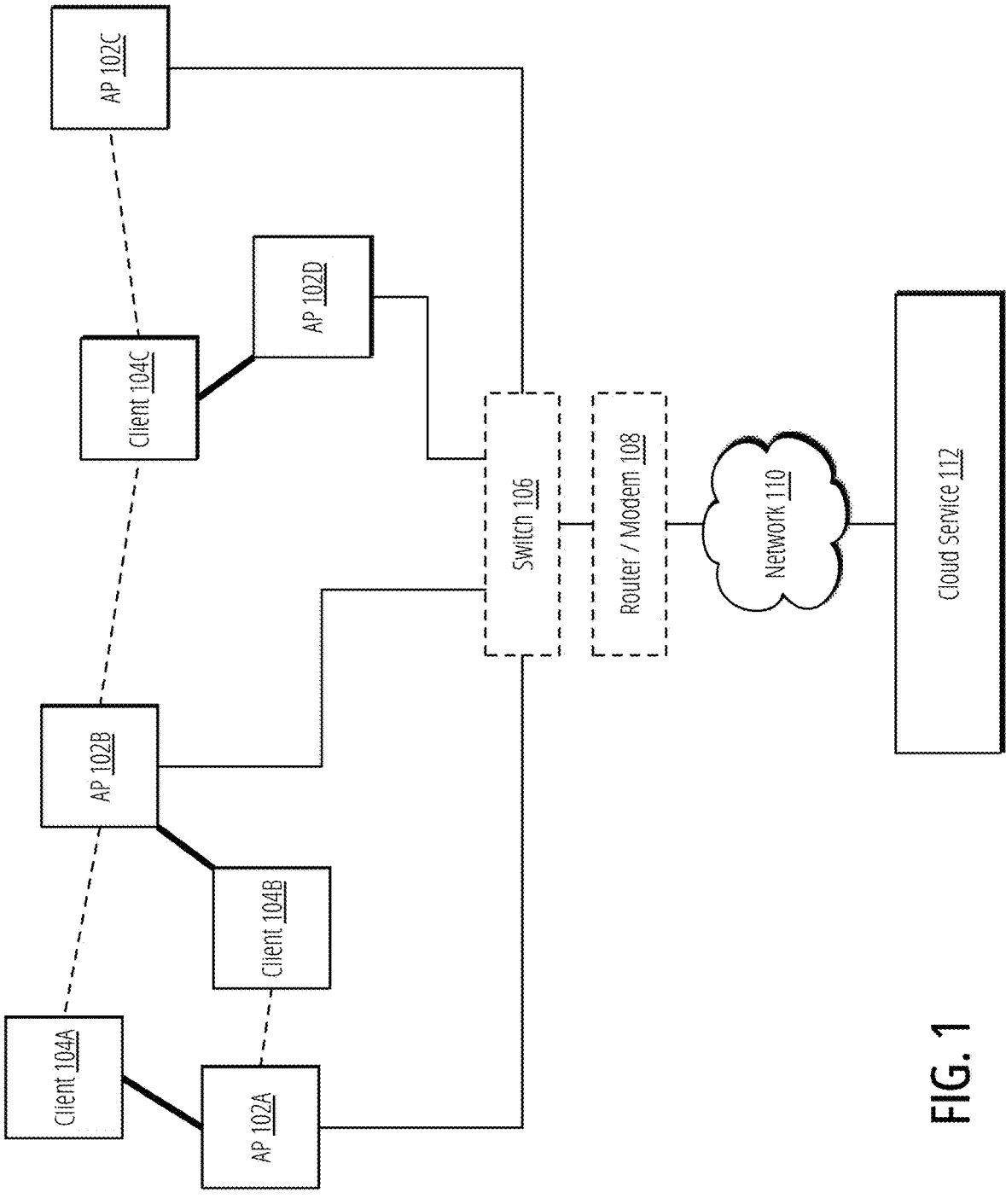
FIG. 1 is a block diagram illustrating a wireless network according to some of the example embodiments.

A given location may include one or more APs. Such devices provide Wi-Fi connectivity to client devices within range of the APs. IEEE 802.11 allows client devices to connect to APs having the same SSID without a loss in connectivity. As such, a client device can "roam" around a larger area equipped with APs having the same SSID while maintaining seamless connectivity.

Frequently, environments such as homes and offices rely almost exclusively on Wi-Fi to provide network connectivity. Such an approach improves flexibility win planning an environment, reduces deployment costs, and enables roaming of mobile devices within the environment.

However, as more devices use Wi-Fi networks, particularly with the proliferation of Internet of Things (IoT) devices, management within such an environment becomes increasingly complex. A central challenge in managing devices on a network is accurately determining the locations of mobile devices within the network. Traditional methods, which often rely on the strength of the wireless signal between the device and access point, provide only approximate location information and are influenced by a variety of factors, such as interference from other devices and physical barriers within the environment. Additionally, these methods are generally insufficient for real-time tracking or for environments with multiple interconnected devices, as they do not provide the precise and timely data required. As a result, key applications such as asset or object tracking, geo-fencing, location-based notifications, physical security functions, or the creation of virtual representations of environments can be hampered or rendered ineffective.

To illustrate the technical challenges, consider the case of a homeowner trying to create a floorplan of a house covered by a Wi-Fi network for a smart home application. Under the current system, the homeowner would have to manually position each device within the floorplan since precise locations are not readily available. This process is not only laborious and time-consuming but also susceptible to errors. Similarly, for businesses using IoT devices to track inventory within a large warehouse, the lack of accurate location data can lead to misplacement of items, inefficient usage of space, and increased search times, thereby leading to significant operational inefficiencies. Additionally, in security applications, imprecise device location can lead to suboptimal camera coverage or failure in identifying potential breaches, thus compromising the security of the premises.

The example embodiments solve these any other problems in the technical art of Wi-Fi networking by providing an improved technique for locating devices within a Wi-Fi environment that employs multiple (e.g., three or more) APs. In some implementations, the APs may be part of the same SSID or may belong to different SSIDs. In some implementations, the embodiments include utilizing a trilateration algorithm on a given client device based on AP reports provided by the client device. Then, the embodiments can utilize device typing data to classify client devices and provide location-based services based on locations and type data.

To illustrate a possible application, consider an environment with several devices located in different rooms. The technique can locate two devices in proximity and use type data to classify a specific location (e.g., a room) based on the devices' locations, their proximity to each other, and their types. This could, for example, allow the system to automatically identify and label a "living room" based on the presence and proximity of devices like a smart TV, a Wi-Fi enabled home theater system, and a smart light system. Thus, this solution enables not just precise device location, but also the creation of more accurate and dynamic virtual representations of the environment.

In some implementations, the techniques described herein relate to a method including: transmitting, by an access point, a message to a wireless device and receiving a response to the message, the response including a list of access points nearby the wireless device; determining, by the access point, a location of the wireless device based on the list of access points utilizing a trilateration algorithm; determining, by the access point, a type of the wireless device; identifying, by the access point, one or more nearby wireless devices within a threshold proximity to the wireless device; and categorizing, by the access point, one of the wireless device or a location of the wireless device based on the one or more nearby wireless devices and the type of the wireless device.

In some implementations, the techniques described herein relate to a method, wherein the message includes one of an IEEE 802.11k Radio Measurement Request or IEEE 802.11v BSS Transition Management Request.

In some implementations, the techniques described herein relate to a method, wherein each access point in the list of access points is associated with a value measured by the wireless device in response to the message.

In some implementations, the techniques described herein relate to a method, wherein the value includes one or more of a Channel State Information value, Received Signal Strength Indicator, Received Channel Power Indicator, or Received Signal to Noise Indicator.

In some implementations, the techniques described herein relate to a method, wherein determining the location of the wireless device includes determining an absolute position of the wireless device.

In some implementations, the techniques described herein relate to a method, wherein determining the location of the wireless device includes determining a relative position of the wireless device.

In some implementations, the techniques described herein relate to a method, further including generating a visual representation of an environment including the location based on a type and position of the wireless device and a second type and second position of a second wireless device.

In some implementations, the techniques described herein relate to a non-transitory computer-readable storage medium for tangibly storing computer program instructions capable of being executed by a computer processor, the computer program instructions defining steps of: transmitting a message to a wireless device and receiving a response to the message, the response including a list of access points nearby the wireless device; determining, based on the list of access points, a location of the wireless device utilizing a trilateration algorithm; determining a type of the wireless device; identifying one or more nearby wireless devices within a threshold proximity to the wireless device; and categorizing one of the wireless device or a location of the wireless device based on the one or more nearby wireless devices and the type of the wireless device.

In some implementations, the techniques described herein relate to a non-transitory computer-readable storage medium, wherein the message includes one of an IEEE 802.11k Radio Measurement Request or IEEE 802.11v BSS Transition Management Request.

In some implementations, the techniques described herein relate to a non-transitory computer-readable storage medium, wherein each access point in the list of access points is associated with a value measured by the wireless device in response to the message.

In some implementations, the techniques described herein relate to a non-transitory computer-readable storage medium, wherein the value includes one or more of a Channel State Information value, Received Signal Strength Indicator, Received Channel Power Indicator, or Received Signal to Noise Indicator.

In some implementations, the techniques described herein relate to a non-transitory computer-readable storage medium, wherein determining the location of the wireless device includes determining an absolute position of the wireless device.

In some implementations, the techniques described herein relate to a non-transitory computer-readable storage medium, wherein determining the location of the wireless device includes determining a relative position of the wireless device.

In some implementations, the techniques described herein relate to a non-transitory computer-readable storage medium, the steps further including generating a visual representation of an environment including the location based on a type and position of the wireless device and a second type and second position of a second wireless device.

In some implementations, the techniques described herein relate to a device including: a processor; and a storage medium for tangibly storing thereon logic for execution by the processor, the logic including instructions for: transmitting a message to a wireless device and receiving a response to the message, the response including a list of access points nearby the wireless device, determining, based on the list of access points, a location of the wireless device utilizing a trilateration algorithm, determining a type of the wireless device, identifying one or more nearby wireless devices within a threshold proximity to the wireless device, and categorizing one of the wireless device or a location of the wireless device based on the one or more nearby wireless devices and the type of the wireless device.

In some implementations, the techniques described herein relate to a device, wherein the message includes one of an IEEE 802.11k Radio Measurement Request or or IEEE 802.11v BSS Transition Management Request.

In some implementations, the techniques described herein relate to a device, wherein each access point in the list of access points is associated with a value measured by the wireless device in response to the message.

In some implementations, the techniques described herein relate to a device, wherein the value includes one or more of a Channel State Information value, Received Signal Strength Indicator, Received Channel Power Indicator, or Received Signal to Noise Indicator.

In some implementations, the techniques described herein relate to a device, wherein determining the location of the wireless device includes determining an absolute position of the wireless device.

In some implementations, the techniques described herein relate to a device, wherein determining the location of the wireless device includes determining a relative position of the wireless device.

FIG. 1 is a block diagram illustrating a wireless network according to some of the example embodiments.

In the illustrated environment, a plurality of client devices are depicted including client device 104A, client device 104B, and client device 104C. The client devices may be any type of Wi-Fi-enabled devices commonly found in homes, offices, or other environments where wireless connectivity is required. The client devices can include, but are not limited to, personal computers, laptops, smartphones, tablets, smart TVs, smart home devices like thermostats or light systems, IoT sensors, security cameras, or other Wi-Fi-enabled electronic devices. Each of the client devices may support one or more communication protocols, such as various IEEE 802.11 protocols (described herein). The client devices may also include additional features, such as multi-band capabilities, different power saving modes, and security features, among others. These client devices connect to the Wi-Fi network by establishing a wireless connection with one or more APs within range, in order to communicate with other devices within the network or to access services available on the Internet. Unique functional aspects of the client devices are described more fully with respect to FIG. 3.

As illustrated, the client devices are communicatively coupled to access points including, but not limited to, AP 102A, AP 102B, AP 102C, and AP 102D. These APs provide Wi-Fi connectivity and data transmission within the network. They can function as standalone devices or be integrated within larger network infrastructures such as routers or network switches.

APs are typically dispersed strategically within the environment, offering coverage over defined areas to ensure optimal connectivity for all client devices. APs are capable of managing multiple concurrent connections from various client devices and adhere to a range of communication protocols. Examples of such protocols, discussed in more detail herein, are IEEE 802.11k, IEEE 802.11v, and IEEE 802.11mc standards, although any wireless standard may be implemented as an alternative or in conjunction with these standards. The IEEE 802.11k standard relates to radio resource management and enhances client device roaming by enabling client devices to assess the radio frequency environment around them. This allows devices to discover the best available AP to connect to, improving overall network efficiency. The IEEE 802.11mc standard, also known as Fine Time Measurement (FTM), enhances Wi-Fi-based indoor positioning systems by providing more accurate distance measurements between a client device and multiple APs, thereby improving location accuracy. Nonstandard uses of aspects of these two protocols (and similar protocols) are discussed in more detail herein.

Each AP can provide dual or multi-band capabilities to cater to various devices and applications, often operating within the 2.4 GHz and 5 GHz frequency bands. APs can also be equipped with robust security features such as WEP, WPA, or WPA2 protocols to maintain data integrity and confidentiality within the network. Advanced features such as beamforming may also be incorporated to enhance signal quality and device connectivity. Within the context of the described embodiments, these APs play a dual role of providing seamless Wi-Fi connectivity and enabling the accurate location determination of client devices within the network using the trilateration algorithm, discussed more fully in the description FIG. 2.

As illustrated, each client device can communicate with any AP that is in range. However, a client device may only transmit data with a single AP. For example, client device 104A may transmit and receive data via AP 102A (indicated by the darkened connection) while may be capable of detecting AP 102B (indicated by the dashed connection). In some implementations, the client device can report on the detectable APs as described in FIGS. 2 and 3.

Each AP can be communicatively coupled to a switch 106. The switch 106, often part of a larger network infrastructure, serves as a central node that forwards data packets across the network. The switch 106 can be a physical device or a software program running on a server or a dedicated network computer. It can operate at different layers of the OSI (Open Systems Interconnection) model, with Layer 2 (Data Link Layer) switches and Layer 3 (Network Layer) switches being the most common. The APs are connected to the switch 106 via wired or wireless connections, enabling the APs to communicate with each other and with other networked devices. The switch can manage traffic between APs and facilitate communication between devices connected to different APs. In some implementations, the switch can manage and coordinate the data exchange between APs for the trilateration algorithm and the determination of client devices' locations.

Switch 106 is communicatively coupled to a router and modem 108. In some implementations, router and modem 108 may comprise separate devices. In other implementations, the router and modem 108 can comprise a combined device (e.g., a gateway). The router and modem 108 is communicatively coupled to a wide area network 110, such as the Internet. In some implementations, the modem facilitates communication with the internet service provider (ISP) by modulating and demodulating signals to and from the wide area network. On the other hand, in some implementations, the router manages internal data traffic by directing data packets to their intended destinations within the local network.

Regardless of their physical configuration, the router and modem 108 function as a bridge between the local network managed by the switch and the wide area network 110, such as the Internet. This connection enables the client devices connected to the APs to access online resources and services, while also allowing for remote management and monitoring of the network and its devices. In some implementations, the router and modem 108 may be used for gathering, processing, or forwarding the data used by the trilateration algorithm for the location of client devices within the Wi-Fi network.

For example, a cloud service 112 may be used to provide some or all of the functionality described herein. In general, the cloud service 112 may comprise one or more remote computing devices or servers, running software that manages and processes the location data of devices within the Wi-Fi network. The cloud service 112 can operate on various cloud computing models, such as Infrastructure as a Service (IaaS), Platform as a Service (PaaS), or Software as a Service (SaaS), depending on the specific requirements of the system.

The cloud service 112 can also use various data analytics and processing techniques to implement the functionality described herein. This could include the processing of raw location data, the execution of the trilateration algorithm, management of device typing data, and the provision of location-based services, among others. Cloud service 112 can provide scalability, accessibility, and robustness, handling large volumes of data and serving a multitude of client devices simultaneously. It allows for updates and enhancements to be deployed seamlessly, without disrupting the operation of the Wi-Fi network or requiring changes to the client devices or APs. Communication between the cloud service 112 and the local network is typically facilitated by the router and modem 108, via the wide area network 110. This allows the cloud service 112 to retrieve data from the network, perform necessary computations or processes, and then send back results or commands as needed.

In some implementations, the use of cloud service 112 can be optional and some of all functionality of cloud service 112 may be implemented in any of the illustrated devices local to the network. For example, router and modem 108 may include code to perform the functions of cloud service 112.

Figure 2:
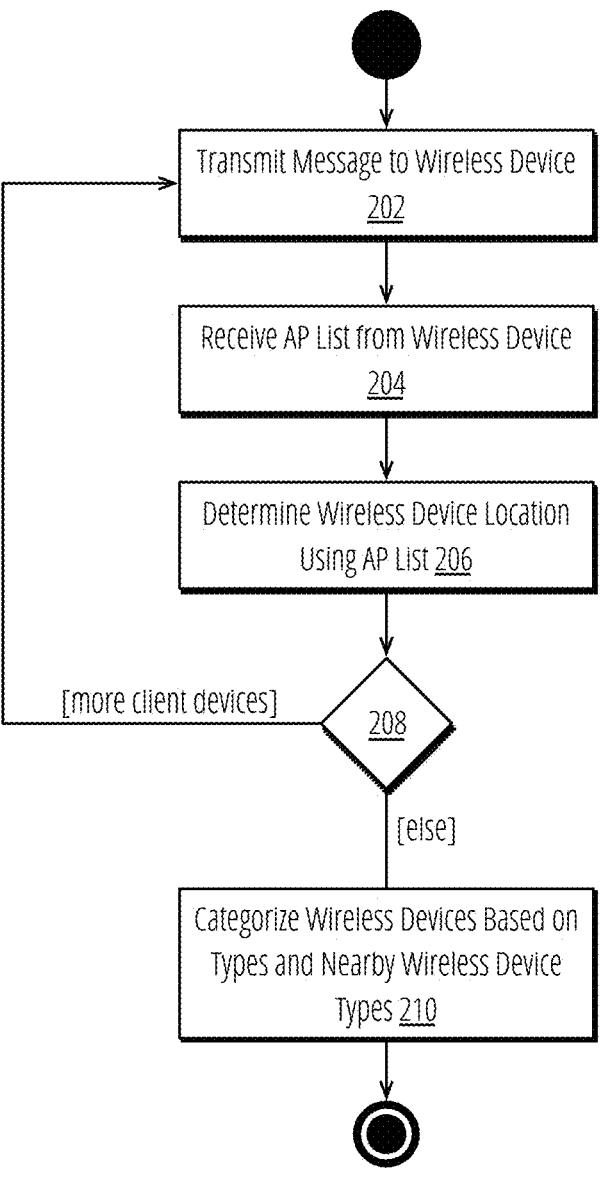
FIG. 2 is a flow diagram illustrating a method for tri-laterating a wireless device according to some of the example embodiments.

FIG. 2 is a flow diagram illustrating a method for trilateraling a wireless device according to some of the example embodiments.

In step 202, the method can include a transmitting a message to the wireless device. In some implementations, step 202 can be implemented by an access point or another networking device of a wireless network (e.g., a gateway, router, switch, etc.). In general, any device that is capable of being communicatively coupled to an access point or wireless router can execute the method.

The wireless device can comprise any type of device that includes a wireless transceiver. Wireless devices may include dynamic or kinematic devices (e.g., devices that can change location) as well as static device (e.g., devices that, overall, are stationary). An example of a dynamic device is a mobile phone while an example of a static device is a refrigerator. Notably, static devices may change their location, however these changes are often infrequent (if ever occurring).

In some implementations, step 202 can include transmitting a message that a wireless device can receive and perform a measurement in response to. One type of message is a Radio Measurement Request message using IEEE 802.11k. This request is a type of Action Frame in 802.11 parlance, and it requests via a Radio Measurement Request that the wireless device perform a beacon measurement via a Beacon Report. In some implementations, the Radio Measurement Request message can prompt the client device to measure and report back on the received signal strength and other properties of the beacons it detects from other APs. In some implementations, the Radio Measurement Request can include information such as the channels to be scanned ("channel number"), the duration of the scan ("duration"), and an SSID of the APs to be scanned ("SSID"). In some implementations, the SSID can be the SSID of the network the wireless device is currently connected to. However, in other implementations, the SSID may be any other SSID nearby the wireless device. In some implementations, the SSID may be blank, causing the wireless device to scan all SSIDs.

As will be discussed in FIG. 3, the wireless device will scan for beacons on the specified channels in the message. As it scans, it will measure the Received Signal Strength Indicator (RSSI), Channel State Information (CSI), and other parameters of each beacon it discovers. Details of this process are provided later in the description of FIG. 3 and are not repeated herein. Although IEEE 802.11k Radio Measurement Request messages are described, the disclosure is not limited to a specific standard and indeed proprietary messages, or other standards may be used. As a non-limiting example, the wireless device may include a pre-installed application that can receive proprietary messages that cause the wireless device to perform a scan of nearby access points.

As another non-limiting example, IEEE 802.11v can be used to transmit a BSS Transition Management Request to nearby client devices to generate and transmit Neighbor Reports similar to that described above. In yet another embodiment, the method can utilize IEEE 802.11mc locationing frames to request the client device scan and return a list of APs.

In step 204, the method can include receiving an AP list from the wireless device. This list may be responsive to the message (e.g., Radio Measurement Request) transmitted in step 202. In some implementations, the AP list can be a Beacon Report as per IEEE 802.11k, although the specific form of the list is not limited as such.

In some implementations, the AP list can include details of each beacon (e.g., AP) detected, including its RSSI, CSI, the SSID or Basic SSID (BSSID) (i.e., the MAC address of the AP that sent the beacon), the channel number, the beacon interval, and capability information. In some implementations, the AP list can further include, for each AP, a measure of the received signal power level in the channel where the beacon was received (e.g., Received Channel Power Indicator or RCPI). In some implementations, the AP list can further include, for each AP, an indication of the quality of the signal received by calculating the ratio between the received signal power and the noise level (e.g., Received Signal to Noise Indicator or RSNI). In some implementations, the AP list can include other informational fields as defined by the operator of the wireless network or manufacturer of the devices therein. The following represents an example of a beacon report wherein three APs were detected:

4. RSNI: The signal-to-noise ratio of the AP's beacon
5. Beacon Interval: The time interval between consecutive beacons from the AP
6. Capability Information: The capabilities of the AP, such as its support for the Extended Service Set (ESS), Short Slot Time, and Short Preamble
7. Elements: Information elements such as the SSID (network name) and the data rates that the AP supports In step 206, the method can include determining the location of the wireless device using the report received in step 204. In some implementations, this step can include utilizing a trilateration algorithm to determine the position of the wireless device based on some of all of the data received for the APs.

In some implementations, the method can store a list of APs and corresponding geographic locations. In this scenario, the method can identify any APs in the reported list that includes APs with known locations.

In some implementations, the method can include using the CSI, RCPI, or RSSI values of APs with known locations to estimate the distance of the wireless device from these APs. In some implementations, a path loss model can be used is used to estimate the distance based on signal strength. For example, a log-distance path loss model may be used to model the distance (in meters) as $10^{((TxPower-RSSI-X)/(10*n))}$, where TxPower is the power at which the beacon signal was transmitted, n is the path loss exponent, which depends on the environment (for indoor environments, it often lies between 2 and 4), and X is a Gaussian random variable with zero mean, representing the random effects of shadowing and multipath. Certainly, other models can be used.

After obtaining at least three distance measurements, the method can proceed to use trilateration to identify a position of the wireless device by plotting circular projections around each AP having a radius equal to its distance from the wireless device and then identifying the intersection of all circular projects as the wireless device position.

In some implementations, the positions of APs may not be known. In this scenario, the method can include determining the relative position of the wireless device versus an absolute position (discussed above). In this scenario, the method may still include determining the three distances between the wireless device and APs (described above). However, since the positions of the APs are not known the method may include establishing a positioning system using a first AP as an origin in space, a second AP as a point on the x axis

TABLE 1

| BSSID | Channel Number | RCPI | RSNI | Beacon Interval | Capability Information | Elements |
|---|---|---|---|---|---|---|
| 00:11:22:33:44:55 | 6 | 200 | 30 | 100 TU | ESS, Short Slot Time, Short Preamble | SSID: Network1, Supported Rates: 24-54 Mbps |
| 00:11:22:33:44:56 | 11 | 150 | 20 | 100 TU | ESS, Short Slot Time, Short Preamble | SSID: Network1, Supported Rates: 24-54 Mbps |
| 00:11:22:33:44:57 | 1 | 250 | 35 | 100 TU | ESS, Short Slot Time, Short Preamble | SSID: Network3, Supported Rates: 24-54 Mbps |

In this example, the wireless device has detected three different APs. Each row in the table represents one AP. For each AP, the table provides information on:
1. BSSID: The MAC address of the AP
2. Channel Number: The radio channel on which the AP's beacon was detected
3. RCPI: The received signal power from the AP's beacon relative to the origin based on the distance between the first AP and the second AP. The third AP can then be placed in the coordinate system based on its distance from the first AP and its distance from the second AP. With this coordinate system, the wireless device's position can then be determine using the aforementioned path loss model and trilateration or similar techniques.

In step 208, the method next determines if any more client devices are to be analyzed. In some implementations, an AP may have or obtain a list of connected wireless devices and may iterate through this list as part of step 208 to obtain locations of each connected wireless device. As such, the method can execute step 202, step 204, and step 206 for each connected device. In some implementations, the method can be extended to multiple APs, wherein each AP executes the method simultaneously, resulting in locations of all wireless devices connected to the Wi-Fi network via the APs.

In step 210, the method can include categorizing the wireless device based on one or more of types of the wireless devices and types of nearby devices. In some implementations, the method can perform this step for each device analyzed using the above steps (i.e., each device having a known location).

In some implementations, the method can utilize properties of the wireless connection of the wireless device, or data transmitted thereon, to determine its type. This could involve analyzing characteristics such as the device's MAC address, the protocols it supports, its transmission power, or its data usage patterns.

For example, the MAC address of a device can often be used to identify the manufacturer of the device, which may in turn be used to identify a type of the device. Protocols supported by the device may also provide hints about its type. For instance, a device that supports the IEEE 802.11ac standard is likely to be relatively modern and could be a high-end smartphone or laptop, while a device that only supports older standards might be an older or simpler device.

Alternatively, or in conjunction with the foregoing, the transmission power of a device could also be used to determine its type. For example, larger devices such as laptops or desktops often have more powerful transmitters than smaller devices such as smartphones or IoT sensors.

Alternatively, or in conjunction with the foregoing, data usage patterns can also be indicative of a device's type. A device that frequently streams high-definition video might be a smart TV or a laptop, while a device that sends small amounts of data at regular intervals might be an IoT sensor.

By analyzing these and potentially other characteristics of a device's wireless connection, the method can infer the type of the device, which can in turn be used to enhance the accuracy and usefulness of the location data.

In other implementations, the method can make use of machine learning techniques to determine the type of a wireless device based on patterns in the data it transmits and receives. Machine learning models can be trained on large datasets of known devices, learning to recognize patterns in various data characteristics that correlate with particular device types.

For instance, a machine learning model might learn that devices that frequently send and receive small packets of data are often IoT sensors, while devices that periodically transmit larger amounts of data might be laptops or smartphones. These models can be trained on a variety of features, such as the amount of data transmitted, the timing of transmissions, the types of protocols used, the MAC address, the transmission power, and so on. In some implementations, the location of the device can be used as an input feature into such a model.

Furthermore, these machine learning models can continuously improve over time. As they are exposed to more data and more diverse types of devices, they can refine their patterns and increase their accuracy in determining device types. This can be particularly useful in environments with a large number of diverse devices, such as a busy office or a smart home with many IoT devices.

Examples of machine learning models that can be trained and utilize include, but are not limited to, Deep Neural Networks (DNN), Recurrent Neural Networks (RNN), Convolutional Neural Networks (CNN), Support Vector Machines (SVM), Decision Trees, Random Forests, Gradient Boosting Machines (GBM), K-Nearest Neighbors (KNN), Logistic Regression, Naive Bayes, Autoencoders, Generative Adversarial Networks (GAN), Long Short-Term Memory (LSTM) networks, Transformer Networks, Reinforcement Learning algorithms.

As illustrated, in some implementations, the typing of a wireless device can be performed independently of its location and thus can be performed in an offline manner. In some implementations, devices can be typed prior to determining their location. In other embodiments, the typing can be done in real-time.

After determining the type of a given wireless device, step 210 can then include identifying nearby wireless devices which are associated with their own types. These locations can be determined using the foregoing methods applied to each wireless devices. Thus, in step 210, for a given wireless device type and location, the method can obtain nearby wireless device types and distances. Based on the types and distances, the method can further categorize the given wireless device and/or the environment that it is in.

In some implementations, the method may make use of a database or other data repository that stores information about the types and typical associations of various wireless devices. This repository can be locally stored or remotely accessed via a cloud service and can be regularly updated as new devices are processed. In some implementations, user feedback can be used to improve the dataset.

For each wireless device, the method can retrieve the device's type, as determined by the steps outlined earlier, and its location, as determined by the trilateration algorithm. It can then use this information to identify nearby devices and their types, using a distance threshold to define what constitutes 'nearby.' The distance threshold can be a fixed value, or it can be dynamically adjusted based on factors such as the density of devices in the environment or the accuracy of the location data.

With this information, the method can then search the data repository for associations between the types of the given device and the types of the nearby devices. For example, if the given device is of a type associated with appliances and is nearby to a device associated with vehicles, this might suggest that the given device is located in a garage.

This process can be enhanced using machine learning techniques to predict the likely subcategory of a device and the likely location based on the types and locations of nearby devices. These predictions can be made using models trained on datasets of known device associations and locations. For example, unsupervised learning techniques like clustering can be used to group similar device types together based on their characteristics and their proximity to each other. Supervised learning techniques, such as Deep Neural Networks (DNN), Random Forests, or Support Vector Machines (SVM), could then be employed to classify the device type and room location, given a set of features derived from device and location data.

Transfer learning can also be employed to leverage existing models trained on vast amounts of device and location data. This allows the model to benefit from prior knowledge and generalize to new, unseen environments more effectively. Moreover, the method can continuously refine these models as more data is collected. As new devices enter the market and as existing devices are used in new ways or in new associations, these changes can be incorporated into the data used to train the models, ensuring that the method remains up-to-date and accurate.

Machine learning models can also play a role in room type identification. Given a set of features such as device types, device associations, and device locations, these models can learn to predict the type of room. This process can be refined over time as more data is collected, improving the accuracy of the room type predictions. In some implementations, user feedback can similarly be used. This may provide a significant improvement as a user can only flag an incorrect room identification based on a single correct or incorrect wireless device association which can involve a clearly identifiable device (e.g., a vehicle versus an unnamed wireless chipset). It is worth noting that while this process may not always be able to provide a definitive answer, it can provide a probabilistic assessment of the likely room type, which can be useful in many contexts. It is also worth noting that the value in this approach is not just in identifying the precise type of a room, but also in providing more granular location information within a broader Wi-Fi environment, which can be highly valuable for a wide range of IoT applications.

As one example of the foregoing embodiments, the given wireless device may be typed as a "Samsung® Appliance" and may be nearby to a device typed as a "Tesla Model S." Further, the locations may indicate that these devices are within one meter of each other. Based on these types and the proximity, the method can further categorize the given wireless device as a refrigerator (assuming that the potential subcategories of Samsung® Appliance provide no other reasonable alternative) and may also further categorize the location of both the given wireless device and the nearby device as "garage" (since a vehicle is unlikely to be located in a kitchen). Here, a user can review the typing information and room identification and flag the result as accurate or inaccurate. As discussed, the user may be easily capable of confirming that they own a garage with a Tesla vehicle and Samsung refrigerator. If so, the confirmed typing and room identification can be added to a training dataset for further model refinement.

In some implementations, the locations and room identifications generated using the above process can further be used in downstream applications.

For example, room identifications can be used to generate a rough estimate of an environments floorplan. By mapping the locations of devices onto a two-dimensional or three-dimensional space, the method can create a basic outline of the physical layout. For instance, clusters of devices associated with kitchen appliances might indicate the location of the kitchen, while a cluster of devices associated with office equipment might suggest the location of a home office. Distinct areas identified as bedrooms or bathrooms could be marked accordingly. These clusters could be connected based on their proximities to create an estimated layout of the rooms within the environment. A machine learning model could also be used to refine this floorplan, learning from a multitude of data about room types, device types, device locations, and inter-room distances. The model can predict the likely locations of walls, doors, and other architectural features, enhancing the accuracy of the floorplan. This estimated floorplan could then be presented to a user for validation or further refinement. For example, the user could confirm or correct the room types, adjust the room sizes or shapes, or add or remove architectural features. This user feedback could be incorporated back into the model, improving its performance over time. It is important to note that while this process might not yield a perfectly accurate floorplan, it can provide a useful starting point, saving time and effort in creating a more detailed and accurate floorplan. It also has the potential to automatically update the floorplan as devices are added, removed, or moved within the environment, or as the function of rooms change, maintaining an up-to-date representation of the environment's layout.

This floorplan can then be used to track the movements of mobile wireless devices within an environment. As a wireless device moves within the range of various APs, the method can continuously update its location based on the trilateration algorithm and the known positions of the APs. These movements can then be plotted on the floorplan, providing a visual representation of the device's path through the environment. For instance, a smartphone might be seen moving from the living room to the kitchen, then upstairs to a bedroom. A robotic vacuum could be tracked as it navigates through the rooms of a house.

This tracking data can provide valuable insights for various applications. For example, it could be used to analyze patterns in device usage or human activity within the environment. It could support security applications by detecting unexpected movements or identifying the locations of security incidents. For automation (e.g., IoT automation) purposes, the movement patterns could trigger specific actions, such as adjusting lighting or temperature as a person moves through a home. In a business setting, it could help with asset management or employee safety, by providing real-time location data for equipment or personnel.

Machine learning models could also be applied to this tracking data to predict future movements or to detect anomalies. For example, if a device typically moves along certain paths at certain times, the model could predict where the device is likely to be at a given time. If a device moves in an unusual way, the model could flag this as a potential issue for further investigation.

Further, in some implementations, IEEE 802.11mc can be used along with angle of arrival (AoA) to construct a spatial map of the environment. IEEE 802.11mc, also known as Wi-Fi Time-of-Flight, provides a mechanism for measuring the round-trip time of a Wi-Fi signal from a client device to an AP and back, thereby enabling fine-grained distance measurements between devices. Meanwhile, Angle of Arrival (AoA) techniques can determine the direction from which the Wi-Fi signal is received. In combination, these two techniques provide both distance and direction information, which can be used to construct a spatial map of the environment. Specifically, by applying these techniques across multiple APs, it's possible to pinpoint the location of a client device within a three-dimensional space relative to the APs.

For instance, the method could utilize AoA measurements from multiple APs to estimate the direction of a signal from a client device. By intersecting these directions with the distance information from IEEE 802.11mc, it's possible to triangulate the client device's position. This spatial map can offer a more detailed and accurate picture of the environment, which could be particularly useful for applications that require precise location information. For instance, this could enable accurate indoor positioning and navigation, enhanced security monitoring, or sophisticated automation based on the spatial relationships between devices. Furthermore, by tracking changes in the AoA and distance measurements over time, the method could detect and map out physical changes within the environment, such as the movement of furniture or the addition or removal of walls or barriers.

Machine learning models can also be employed to refine this spatial mapping process. For instance, a model could learn to correct for measurement errors or signal interference, or to predict the impact of environmental factors such as building materials on the signal propagation. This would further enhance the accuracy and reliability of the spatial map.

Figure 3:
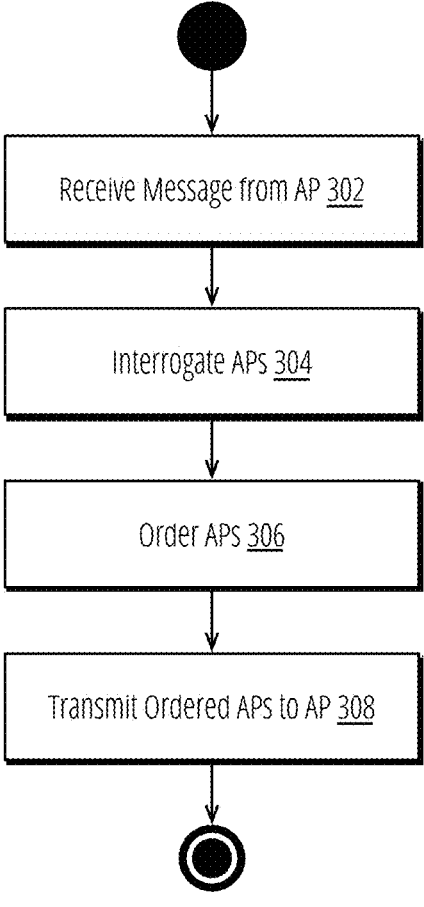
FIG. 3 is a flow diagram illustrating a method for generating a list of APs according to some of the example embodiments.

FIG. 3 is a flow diagram illustrating a method for generating a list of APs according to some of the example embodiments.

In step 302, the method can include receiving a message from an AP. In an implementation, the message can comprise a wireless message transmitted by the AP that requests information about APs nearby the client device.

As one example, the message can comprise a beacon report request issued by the AP the client device is currently connected to. In some implementations, the client device may advertise a Beacon Report Capability in their RRM Enabled Capabilities information element and thus the AP may identify those client devices that are capable of responding. Other message types can be used including, but not limited to, Frame Report, Channel Load Report, Noise Histogram Report, Hidden Node Report, Medium Sensing Time Histogram Report, STA Statistics Report, and Location Configuration Information requests.

In step 304, the method can include the client device interrogating APs.

In response to the request received in step 302, in some implementations, the client device can perform several types of measurements, including measurements of the radio-frequency (RF) environment, measurements of the client device's link to the AP, and measurements of other APs in the vicinity.

In some implementations, the client device can his measure data about the radio frequency conditions in the vicinity of a device. This could include the presence and strength of interfering signals, noise levels, and other factors that could affect the performance of wireless communication. In some implementations, using IEEE 802.11k, the client device can generate a Channel Load Report, which provides information about how busy a particular channel is.

Alternatively, or in conjunction with the foregoing, the client device can further measure a current connection to its associated AP. They can include data about the quality of the link, the data rate, the signal strength, etc. As one example, the client device can generate a responsive Beacon Report, which provides information about the beacon frames the client device detects, including the one from its associated AP. As another example, the client device can generate a Link Measurement, which includes the client's received signal strength from the AP, and the client's estimate of how well the AP can hear its transmissions.

Alternatively, or in conjunction with the foregoing, the client device can measure other APs nearby but not that it is not connected to. In some implementations, these measurements can be provided by the current AP via a Neighbor Report, which lists other APs in the same network, their BSSIDs, and their channels. Alternatively, or in conjunction with the foregoing, the client device can report metrics of the other APs in a Beacon Report (discussed above), which includes beacon frames from APs other than the one the client is currently connected to.

In general, the various interrogations performed above can generate measurement data for all detectable APs within range of the client device. In some implementations, this measurement data can include at least one measurement that can be used to determine distance. For example, in some implementations, the client device can determine a CSI or RSSI for each AP using the above techniques. Other measurements, such as Fine Timing Measurement (FTM), can also be used.

In step 306, the method can include ordering the APs. In some implementations, this step may be optional, or may be performed by another device. In some implementations, the client device can order the APs based on one or more measurements that can be used to determine distance. For example, the client device may order the APs based on corresponding CSI, RSSI, or FTM values. As such, an in general, the client device can order the APs based on their likely distance from the client device at the time of measurement. In some implementations, step 306 can further include filtering the ordered list of APs to a set number. For example, the client device may order the APs and return the top three (i.e., the three closest) APs. The specific number is not limiting.

In step 308, the method can include returning the list of APs to the AP the client device is currently connected to. In some implementations, this transmittal can take the form of a responsive message to the message received in step 302 and received in step 204 of FIG. 2.

Figure 4:
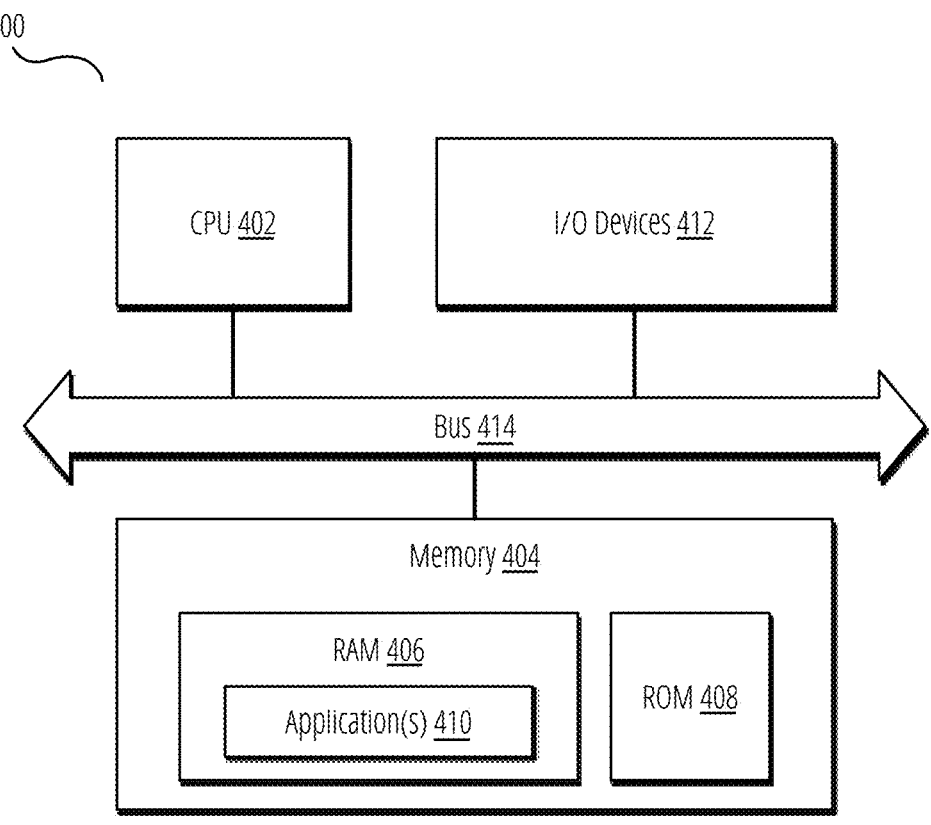
FIG. 4 is a block diagram of a computing device according to some embodiments of the disclosure.

FIG. 4 is a block diagram of a computing device according to some embodiments of the disclosure.

As illustrated, the device 400 includes a processor or central processing unit (CPU) such as CPU 402 in communication with a memory 404 via a bus 414. The device also includes one or more input/output (I/O) or peripheral devices 412. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 402 may comprise a general-purpose CPU. The CPU 402 may comprise a single-core or multiple-core CPU. The CPU 402 may comprise a system-on-a-chip (SoC) or a similar embedded system. In some embodiments, a graphics processing unit (GPU) may be used in place of, or in combination with, a CPU 402. Memory 404 may comprise a memory system including a dynamic random-access memory (DRAM), static random-access memory (SRAM), Flash (e.g., NAND Flash), or combinations thereof. In one embodiment, the bus 414 may comprise a Peripheral Component Interconnect Express (PCIe) bus. In some embodiments, the bus 414 may comprise multiple busses instead of a single bus.

Memory 404 illustrates an example of a non-transitory computer storage media for the storage of information such as computer-readable instructions, data structures, program modules, or other data. Memory 404 can store a basic input/output system (BIOS) in read-only memory (ROM), such as ROM 408 for controlling the low-level operation of the device. The memory can also store an operating system in random-access memory (RAM) for controlling the operation of the device.

Applications 410 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 406 by CPU

402. CPU 402 may then read the software or data from RAM 406, process them, and store them in RAM 406 again.

The device may optionally communicate with a base station (not shown) or directly with another computing device. One or more network interfaces in peripheral devices 412 are sometimes referred to as a transceiver, transceiving device, or network interface card (NIC).

An audio interface in peripheral devices 412 produces and receives audio signals such as the sound of a human voice. For example, an audio interface may be coupled to a speaker and microphone (not shown) to enable telecommunication with others or generate an audio acknowledgment for some action. Displays in peripheral devices 412 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 412 may comprise any input device arranged to receive input from a user. An illuminator in peripheral devices 412 may provide a status indication or provide light. The device can also comprise an input/output interface in peripheral devices 412 for communication with external devices, using communication technologies, such as USB, infrared, Bluetooth®, or the like. A haptic interface in peripheral devices 412 provides tactile feedback to a user of the client device.

A GPS receiver in peripheral devices 412 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 4, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   transmitting, by an access point, a message to a wireless device and receiving a response to the message, the response including a list of access points nearby the wireless device;
   determining, by the access point, a location of the wireless device based on the list of access points utilizing a trilateration algorithm;
   determining, by the access point, a type of the wireless device;
   identifying, by the access point, one or more nearby wireless devices within a threshold proximity to the wireless device; and
   categorizing, by the access point, one of the wireless device or a location of the wireless device based on the one or more nearby wireless devices and the type of the wireless device.

2. The method of claim 1, wherein the message comprises one of an IEEE 802.11k Radio Measurement Request or IEEE 802.11v BSS Transition Management Request.

3. The method of claim 1, wherein each access point in the list of access points is associated with a value measured by the wireless device in response to the message.

4. The method of claim 3, wherein the value comprises one or more of a Channel State Information value, Received Signal Strength Indicator, Received Channel Power Indicator, or Received Signal to Noise Indicator.

5. The method of claim 1, wherein determining the location of the wireless device comprises determining an absolute position of the wireless device.

6. The method of claim 1, wherein determining the location of the wireless device comprises determining a relative position of the wireless device.

7. The method of claim 1, further comprising generating a visual representation of an environment including the location based on a type and position of the wireless device and a second type and second position of a second wireless device.

8. A non-transitory computer-readable storage medium for tangibly storing computer program instructions capable of being executed by a computer processor, the computer program instructions defining steps of:

transmitting a message to a wireless device and receiving a response to the message, the response including a list of access points nearby the wireless device;

determining, based on the list of access points, a location of the wireless device utilizing a trilateration algorithm;

determining a type of the wireless device;

identifying one or more nearby wireless devices within a threshold proximity to the wireless device; and categorizing one of the wireless device or a location of the wireless device based on the one or more nearby wireless devices and the type of the wireless device.

9. The non-transitory computer-readable storage medium of claim 8, wherein the message comprises one of an IEEE 802.11k Radio Measurement Request or IEEE 802.11v BSS Transition Management Request.

10. The non-transitory computer-readable storage medium of claim 8, wherein each access point in the list of access points is associated with a value measured by the wireless device in response to the message.

11. The non-transitory computer-readable storage medium of claim 10, wherein the value comprises one or more of a Channel State Information value, Received Signal Strength Indicator, Received Channel Power Indicator, or Received Signal to Noise Indicator.

12. The non-transitory computer-readable storage medium of claim 8, wherein determining the location of the wireless device comprises determining an absolute position of the wireless device.

13. The non-transitory computer-readable storage medium of claim 8, wherein determining the location of the wireless device comprises determining a relative position of the wireless device.

14. The non-transitory computer-readable storage medium of claim 8, the steps further comprising generating a visual representation of an environment including the location based on a type and position of the wireless device and a second type and second position of a second wireless device.

15. A device comprising:

a processor; and a storage medium for tangibly storing thereon logic for execution by the processor, the logic comprising instructions for:

transmitting a message to a wireless device and receiving a response to the message, the response including a list of access points nearby the wireless device, determining, based on the list of access points, a location of the wireless device utilizing a trilateration algorithm, determining a type of the wireless device, identifying one or more nearby wireless devices within a threshold proximity to the wireless device, and categorizing one of the wireless device or a location of the wireless device based on the one or more nearby wireless devices and the type of the wireless device.

16. The device of claim 15, wherein the message comprises one of an IEEE 802.11k Radio Measurement Request or IEEE 802.11v BSS Transition Management Request.

17. The device of claim 15, wherein each access point in the list of access points is associated with a value measured by the wireless device in response to the message.

18. The device of claim 17, wherein the value comprises one or more of a Channel State Information value, Received Signal Strength Indicator, Received Channel Power Indicator, or Received Signal to Noise Indicator.

19. The device of claim 15, wherein determining the location of the wireless device comprises determining an absolute position of the wireless device.

20. The device of claim 15, wherein determining the location of the wireless device comprises determining a relative position of the wireless device.

* * * * *